(12) United States Patent
Xu et al.

(10) Patent No.: US 11,620,903 B2
(45) Date of Patent: Apr. 4, 2023

(54) MACHINE LEARNING MODEL TO FUSE EMERGENCY VEHICLE AUDIO AND VISUAL DETECTION

(71) Applicant: Baidu USA LLC, Sunnyvale, CA (US)

(72) Inventors: Kecheng Xu, Sunnyvale, CA (US); Hongyi Sun, Sunnyvale, CA (US); Qi Luo, Sunnyvale, CA (US); Wei Wang, Sunnyvale, CA (US); Zejun Lin, Sunnyvale, CA (US); Wesley Reynolds, Sunnyvale, CA (US); Feng Liu, Sunnyvale, CA (US); Jiangtao Hu, Sunnyvale, CA (US); Jinghao Miao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 184 days.

(21) Appl. No.: 17/149,659

(22) Filed: Jan. 14, 2021

(65) Prior Publication Data
US 2022/0223037 A1 Jul. 14, 2022

(51) Int. Cl.
| G08G 1/0967 | (2006.01) |
| G08G 1/01 | (2006.01) |
| G08G 1/133 | (2006.01) |
| G06N 3/04 | (2023.01) |

(Continued)

(52) U.S. Cl.
CPC ..... *G08G 1/096725* (2013.01); *G06N 3/0454* (2013.01); *G08G 1/0133* (2013.01); *G08G 1/04* (2013.01); *G08G 1/0965* (2013.01); *G08G 1/096766* (2013.01); *G08G 1/133* (2013.01)

(58) Field of Classification Search
CPC .. G08G 1/096725; G08G 1/0133; G08G 1/04; G08G 1/0965; G08G 1/096766; G08G 1/133
See application file for complete search history.

(56) References Cited

U.S. PATENT DOCUMENTS

| 11,282,385 B2 * | 3/2022 | Lewis | G06K 9/6274 |
| 11,501,532 B2 * | 11/2022 | Gan | G06N 3/0454 |

(Continued)

OTHER PUBLICATIONS

Aparajit Garg et al, "Emergency Vehicle Detection by Autonomous Vehicle," International Journal of Engineering Research and Technology (IJERT), May 1, 2019, 6 Pages.

(Continued)

*Primary Examiner* — Hoi C Lau
(74) *Attorney, Agent, or Firm* — Womble Bond Dickinson (US) LLP

(57) ABSTRACT

According to various embodiments, systems, methods, and mediums for operating an autonomous driving vehicles (ADV) are described. The embodiments use a number of machine learning models to extract features individually from audio data and visual data captured by sensors mounted on the ADV, and then to fuse these extracted features to create a concatenated feature vectors. The concatenated feature vector is provided to a multilayer perceptron (MLP) as input to generate a detection result related to the presence of an emergency vehicle in the surrounding environment. The detection result can be used by the ADV to take appropriate actions to comply with the local traffic rules.

22 Claims, 7 Drawing Sheets

(51) Int. Cl.
  *G08G 1/04* (2006.01)
  *G08G 1/0965* (2006.01)

(56) References Cited

U.S. PATENT DOCUMENTS

| | | | | |
|---|---|---|---|---|
| 2005/0044053 | A1* | 2/2005 | Moreno | G06K 9/6226 |
| | | | | 706/20 |
| 2018/0189572 | A1* | 7/2018 | Hori | G06V 10/462 |
| 2018/0364732 | A1 | 12/2018 | Yaldo et al. | |
| 2018/0374347 | A1 | 12/2018 | Silver et al. | |
| 2019/0163982 | A1* | 5/2019 | Block | G06K 9/6277 |
| 2020/0265273 | A1* | 8/2020 | Wei | G06K 9/6268 |
| 2021/0200803 | A1* | 7/2021 | Zhang | G06F 16/738 |
| 2021/0247201 | A1* | 8/2021 | Hori | G01C 21/3602 |
| 2021/0248183 | A1* | 8/2021 | Pratt | H04B 7/18506 |
| 2021/0358513 | A1* | 11/2021 | Narisetty | G10L 21/0272 |
| 2022/0067479 | A1* | 3/2022 | Lee | G06N 3/02 |
| 2022/0093101 | A1* | 3/2022 | Krishnan | G06V 40/168 |
| 2022/0101629 | A1* | 3/2022 | Liu | G06F 16/75 |
| 2022/0121868 | A1* | 4/2022 | Chen | G06V 40/168 |
| 2022/0141503 | A1* | 5/2022 | Cui | G06V 10/82 |
| | | | | 725/19 |
| 2022/0147602 | A1* | 5/2022 | Streit | G06V 40/1365 |
| 2022/0147607 | A1* | 5/2022 | Streit | G06N 3/0454 |
| 2022/0150068 | A1* | 5/2022 | Streit | G06V 40/50 |
| 2022/0223037 | A1* | 7/2022 | Xu | G08G 1/096725 |
| 2022/0292809 | A1* | 9/2022 | Choudhary | G06N 20/00 |
| 2022/0351348 | A1* | 11/2022 | Chae | G06T 5/50 |
| 2022/0351439 | A1* | 11/2022 | Chae | G10L 13/08 |
| 2022/0358703 | A1* | 11/2022 | Chae | G06N 3/08 |

OTHER PUBLICATIONS

Abhishek Raman et al, "A Hybrid Framework for Expediting Emergency Vehicle Movement on Indian Roads," ICIMIA, Mar. 5, 2020, 6 Pages.

Hongyi Sun et al, "Emergency Vehicles Audio Detection and Localization in Autonomous Driving," Arxiv.org, Cornell University library, Oct. 2, 2021, 6 Pages.

Van-Thuan Tran and Wei-Ho Tsai, "Audio-Vision Emergency Vehicle Detection," IEEE sensors Journal, Nov. 15, 2021, 14 Pages.

Tran, Van-Thuan and Tsai, Wei-Ho, "Acousitc Based Emergency Vehicle Detection Using Convolutional Neural Networks," IEEE Access, Apr. 18, 2020, 12 pages.

Selbes, Berkay and Sert, Mustafa, "Multimodal Vehicle Type Classification Using Convolutional Neural Network and Statistical Representations of MFCC," IEEE Aug. 29, 2017, 6 pages.

* cited by examiner

MACHINE LEARNING MODEL TO FUSE EMERGENCY VEHICLE AUDIO AND VISUAL DETECTION

CROSS-REFERENCE TO RELATED APPLICATIONS

This application is related to application Ser. No. 17/149,638, filed on Jan. 14, 2021. The application is incorporated herein by reference in its entirety.

TECHNICAL FIELD

Embodiments of the present disclosure relate generally to operating autonomous vehicles. More particularly, embodiments of the disclosure relate to fusion of sensor data from multiple sources for emergency vehicle detection.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

An ADV needs to take appropriate actions to comply with local traffic rules when emergency vehicles (e.g. police cars, fire trucks and ambulance) are detected on a road. Therefore, accurately detecting emergency vehicles in a surrounding environment of the ADV is important to a travelling ADV such that the AVD does not have to make unnecessary stops. One approach to increasing the accuracy of detection is to use information from multiple sources (e.g., images and voices from sensors on the ADV) to eliminate the instability of a single source. Such an approach requires a fusion of the information from the multiple sources.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
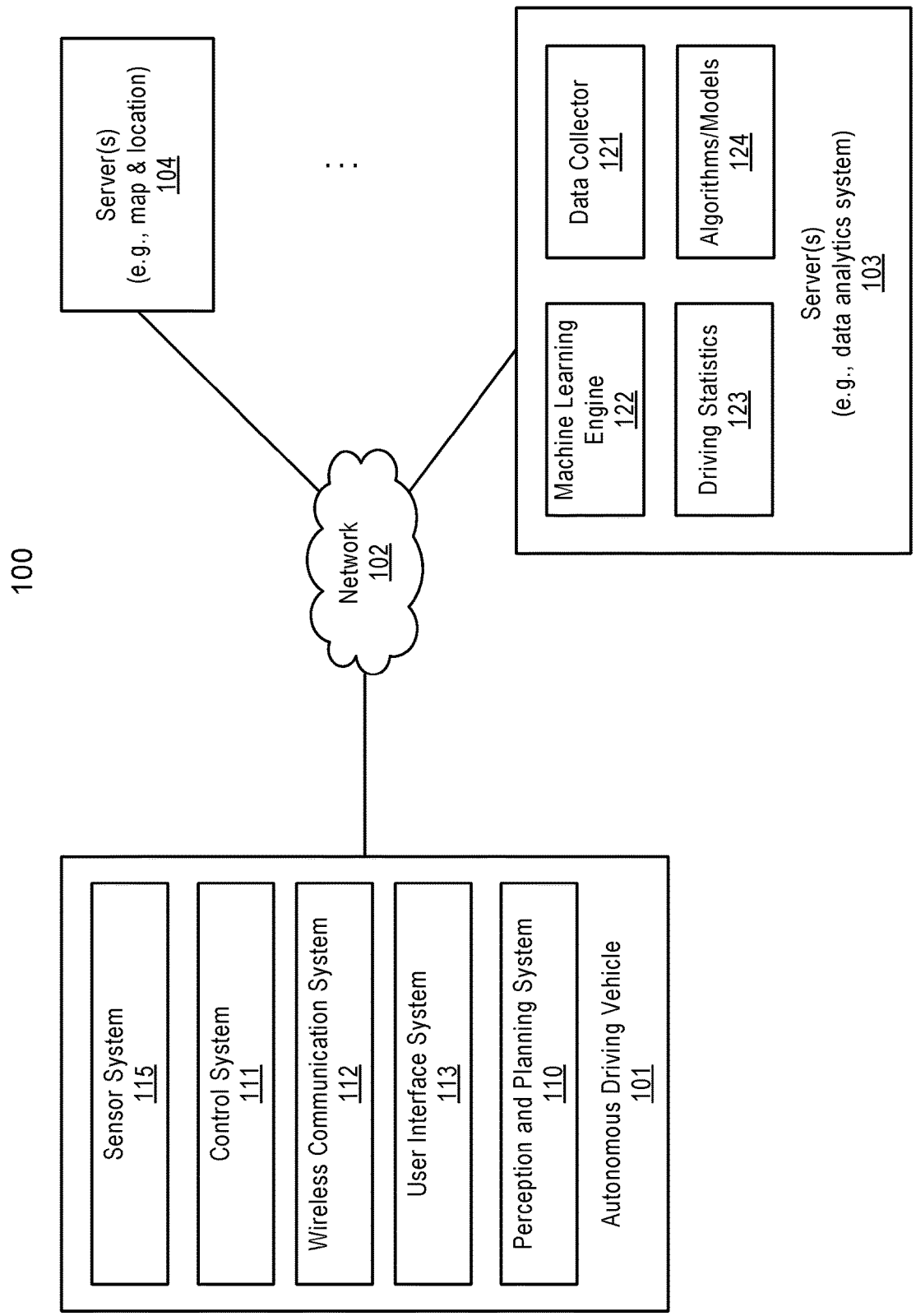
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to various embodiments, systems, methods, and mediums for operating an autonomous driving vehicles (ADV) are described. The embodiments use a number of machine learning models to extract features individually from audio data and visual data captured by sensors mounted on the ADV, and then to fuse these extracted features to create a concatenated feature vectors. The concatenated feature vector is provided to a multiplayer perceptron (MLP) as input to generate a detection result related to the presence of an emergency vehicle in the surrounding environment. The detection result can be used by the ADV to take appropriate actions to comply with the local traffic rules.

Compared to decision-level fusion (post fusion) of the audio data and the visual data, the embodiments in this disclosure can more accurately detect emergency vehicles.

In one embodiment, a method of operating an autonomous driving vehicle (ADV) includes receiving, at an autonomous driving system (ADS) on the ADV, a stream of audio signals and a sequence of image frames, the stream of audio signals captured from a surrounding environment of the ADV using one or more audio capturing devices mounted on the ADV, and the sequence of image frames captured from the surrounding environment using one or more image capturing devices mounted on the ADV; and extracting, by the ADS, a first feature vector from the stream of captured audio signals, and a second feature vector from the sequence of captured image frames. The method further includes concatenating, by the ADS, the first feature vector and the second vector to create a concatenated feature vector; and determining, by the ADS using a first neural network model based on the concatenated feature vector, that an emergency vehicle is present in the surrounding environment of the ADV.

In one embodiment, the first neutral network model is a multi-layer perceptron (MLP) network, which can further output a positon of the emergency vehicle, and a moving direction of the emergency vehicle in addition. The ADS can control the ADV based on the position and the moving direction of the emergency vehicle, including at least one of steering the ADV out of a current driving lane or braking the ADV to decelerate, in response to determining the position of the ADV.

In one embodiment, extracting the first feature vector further includes extracting three different feature vectors using three different neural networks from the stream of captured audio signals. The three different feature vectors can be a vector of basic audio features, a vector of Mel Frequency Cepstral Coefficents (MFCC) features, and a vector of Mel histogram features. The three different feature vectors can then be concatenated into a single audio feature vector, which can be fed to the MLP for further processing.

The embodiments described herein can include non-transitory machine readable media that store executable computer program instructions that can cause one or more data processing systems to perform the one or more methods described herein when the computer program instructions are executed by the one or more data processing systems. The instructions can be stored in non-volatile memory such as flash memory or other forms of memory. The embodiments can also be practiced as system claims.

The above summary does not include an exhaustive list of all embodiments in this disclosure. All systems and methods can be practiced from all suitable combinations of the various aspects and embodiments described in the disclosure.

Autonomous Driving Vehicle

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
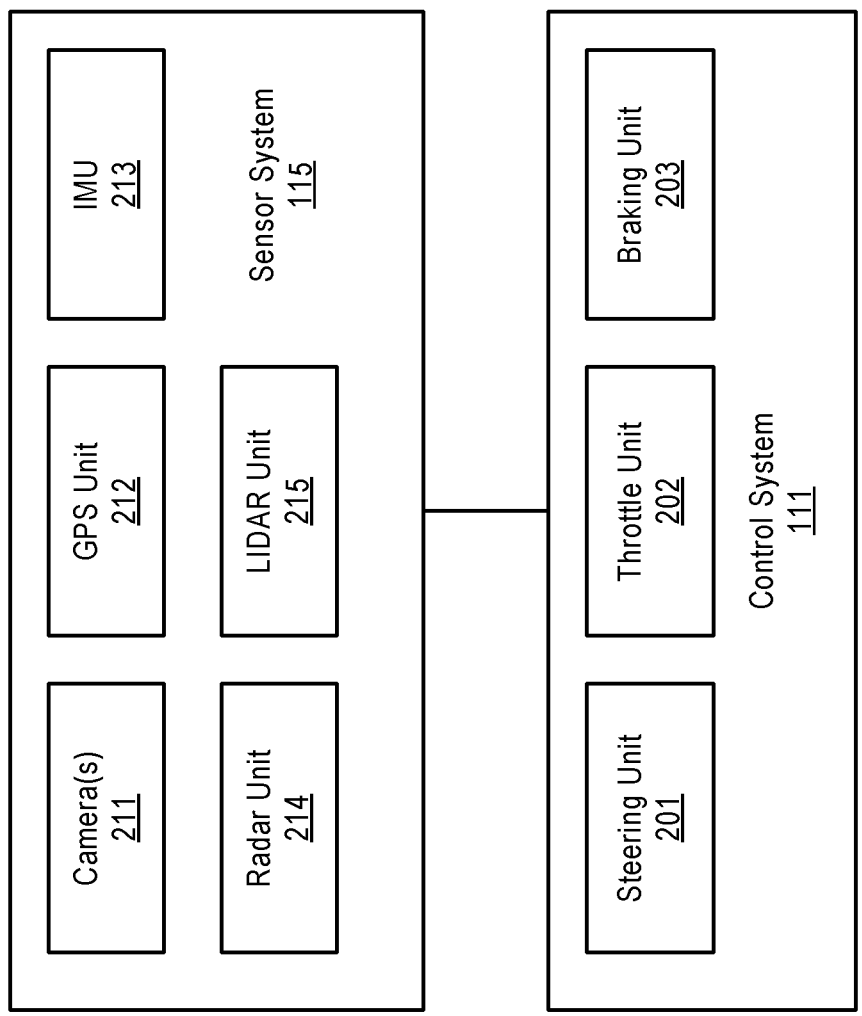
FIG. 2 is a block diagram illustrating an example of an autonomous vehicle according to one embodiment.

Referring now to FIG. 2, in one embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 can then be uploaded on ADVs to be utilized during autonomous driving in real-time.

Figure 3A:
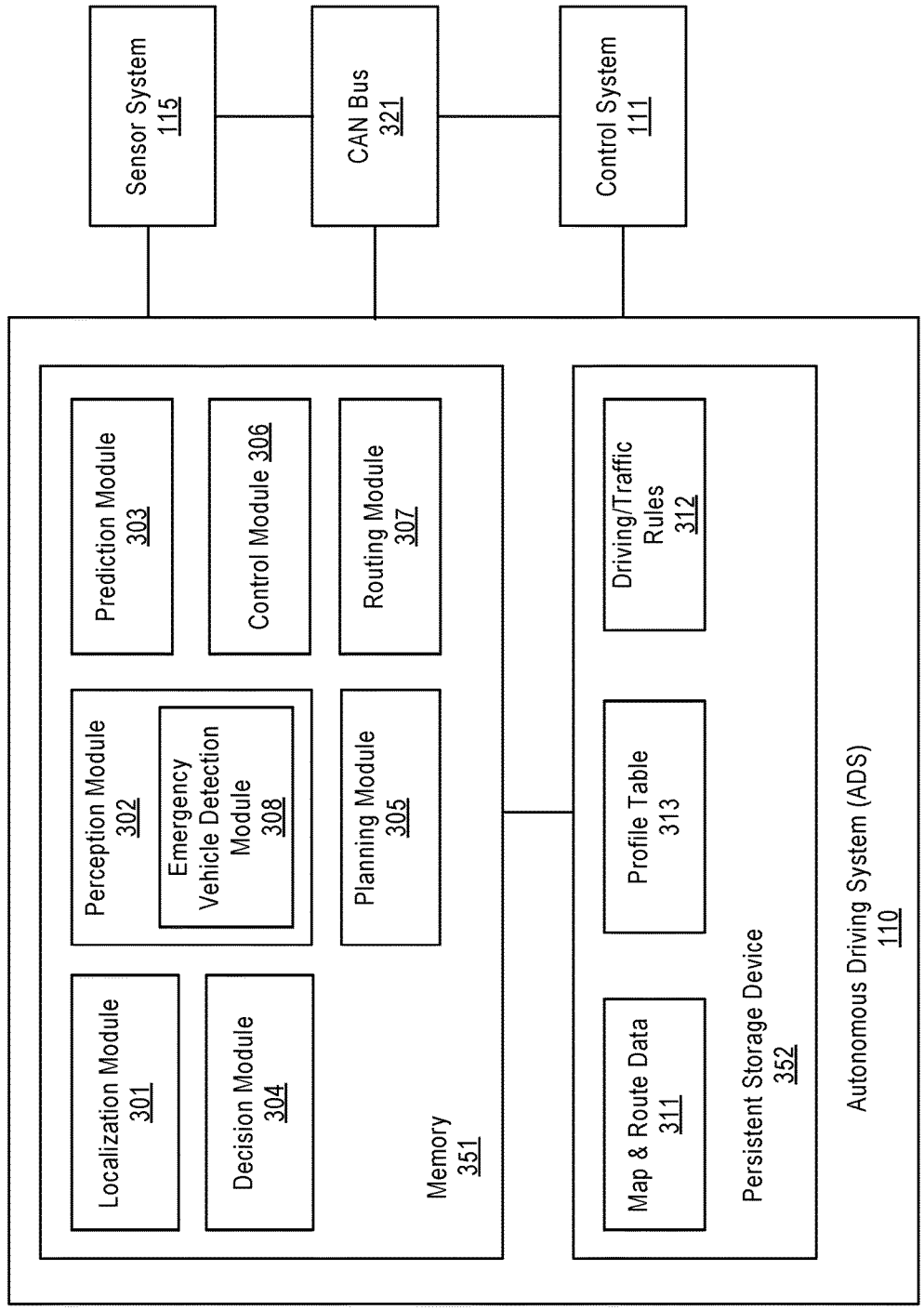
FIGS. 3A-3B are block diagrams illustrating an example of a perception and planning system used with an autonomous vehicle according to one embodiment.
Figure 3B:
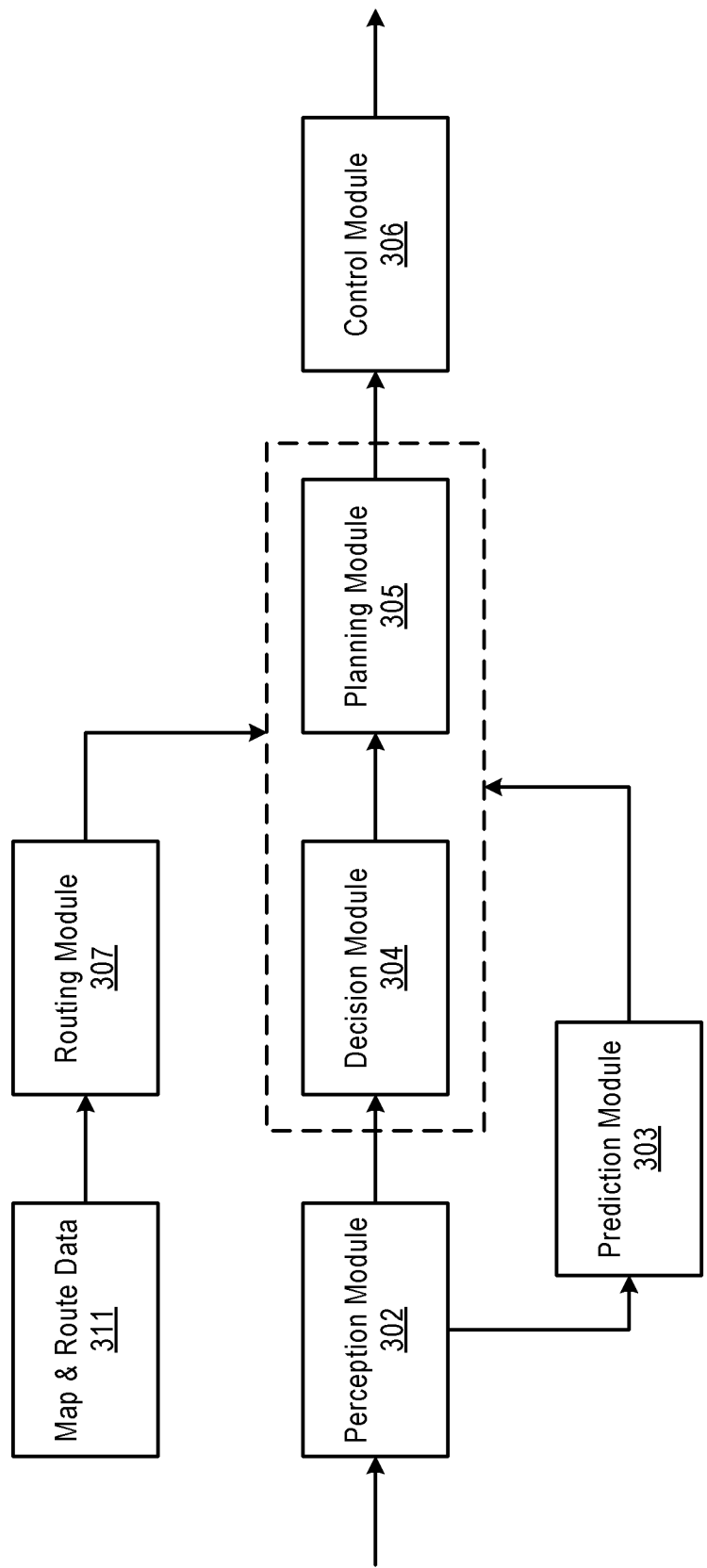

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

Perception module 302 may include an emergency vehicle detection module 308, which can detect the presence of an emergency vehicle in a surrounding environment of the ADV using both audio data and visual data.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route or trajectory for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111 via a CAN bus module 321, according to a trajectory (also referred to as a route or path) defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV 101.

Emergency Vehicle Detection

Figure 4:
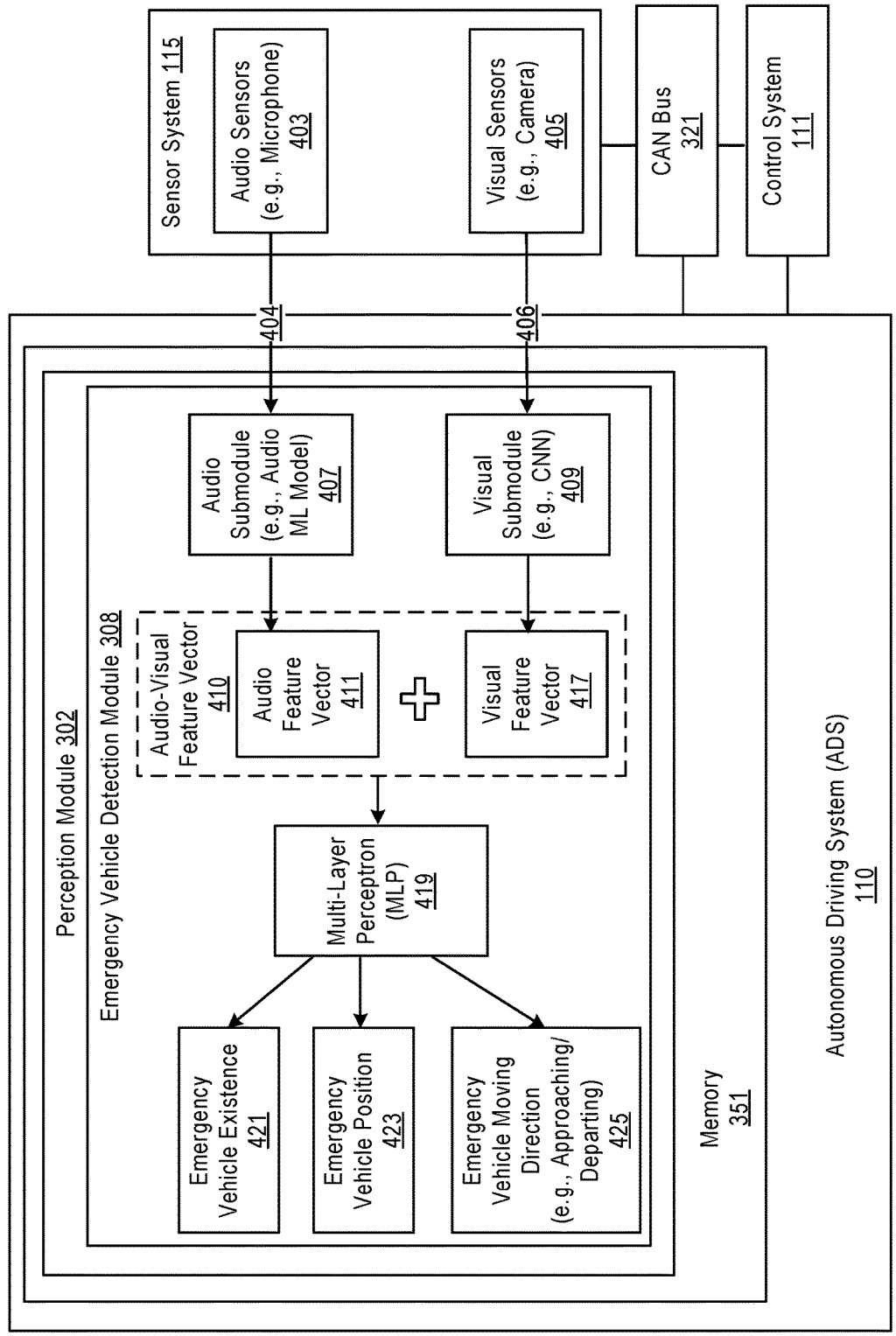
FIG. 4 illustrates an example of an emergency vehicle detection system according to one embodiment.

FIG. 4 illustrates an example of an emergency vehicle detection system 400 according to one embodiment. The emergency vehicle detection module 308 can fuse audio data and visual data at the feature-level. The emergency vehicle detection module 308 includes an audio submodule 407 and a visual submodule 409.

The audio submodule 407 can receive 404 audio data captured by audio sensors 403 mounted on the ADV 101 from a surrounding environment of the ADV, and extract an audio feature vector 411 from the audio data. The visual submodule 409 can receive 406 visual data captured by visual sensors 405, and apply a trained neural network model (e.g., a convolutional network (CNN)) to the captured visual data to extract a visual feature vector 417. The audio feature vector 411 and the visual feature vector 417 can be concatenated into an audio-visual feature vector 410, which can be fed to a multi-layer perceptron (MLP) 419 as input.

In one embodiment, the audio sensors 403 (also referred to as audio capturing devices) can include a number of microphones mounted in different positions of the ADV 101. The microphones can form a microphone array having fixed and known positions on the ADV, arranged to sense sounds in different directions around the ADV 101. The visual sensors or image sensors 405 (also referred to as image capturing devices) can include a number of cameras mounted in different positions on the ADV 101. The audio sensors 403 and the visual sensors 405 can be calibrated such that they can capture audio signals and images from the same object (e.g., an emergency vehicle) that are synchronized. Therefore, in any particular driving cycle, a stream of audio signals captured from the surrounding environment and a sequence of image frames from the surrounding environment can be synchronized.

In one embodiment, the audio submodule 407 can be a software module that implements one or more predetermined algorithms or one or more neural network models. The visual submodule 409 can be a trained neural network model (e.g., a convolutional network (CNN)).

In one embodiment, the audio submodule 407 can convert the stream of audio signals captured from the surrounding environment into a numerical representation, i.e., a numerical array. The audio submodule 407 can then split the numerical array into a number of blocks to match the number of image frames in the sequence of image frames. Features of different levels of abstraction can be extracted from the blocks of the numerical array to form the audio feature vector 411. The details of the feature extraction from the numerical array are discussed in FIG. 5.

In one embodiment, the visual submodule 409 can use a CNN model trained for identifying emergency vehicles to extract visual features. The visual data represented by a sequence of image frames can be fed to the trained CNN as input. Each image frame can forward propagate through the CNN. However, instead of allowing the image frame to forward propagate through each layer of the CNN to reach the output layer, the CNN can stop the propagation at a pre-specified layer (e.g., an activation or pooling layer), and extract values at the pre-specified layer as the visual feature vector 417.

The CNN can be trained using visual data collected from multiple emergency vehicles that traveled on a particular road segment that the ADV is currently travelling or collected from emergency vehicles that travelled on different road segments.

In one embodiment, the emergency vehicle detection module 308 can concatenate the audio feature vector 411 and the visual feature vector 417 into the audio-visual feature vector 410. The process of concatenating the two feature vectors 411 and 417 is a process of performing a feature-level fusion of the audio data and the visual data. In one implementation, the two feature vectors 411 and 417 can be directly concatenated into a single vector without any modification. Under this approach, audio features from each block can be concatenated with visual features from a corresponding image frame. In another implementation, a weighted feature-level fusion approach is used, where features can be selected from each feature vectors 411 and 417 according to a weighed factor. The weighted factor can be a signal-to-noise ratio determined empirically and can be used to measure the level of noisiness on a particular segment of road at different times of a day in different weather conditions. The ratio can be automatically adjusted by the ADV 101 based on the time and weather when the ADV 101 is travelling on the road segment. In one embodiment, the noisier the surrounding environment, the more audio features need to be selected to compensate for the low-quality information from the audio data. Yet another approach is to fuse the two feature vectors 411 and 417 using a trained neutral network, which can determine which features to take from the audio feature vector 411 and the visual feature vector 417 to form the concatenated audio-visual feature 410.

As further shown in FIG. 4, the MLP 419 takes the concatenated audio-visual feature vector 410 as input and output a probability 321 indicating how likely an emergency vehicle is present in the surrounding environment, a position of the emergency vehicle 423, and a moving direction of the emergency vehicle 425.

In one embodiment, the MLP 419 can be a feedforward neural network with one or more layers between the input and the output layer. In the MLP 419, data flows in one direction from the input to the output layer. The MLP 419 can be trained with a backpropagation learning algorithm using concatenated audio-visual features extracted from audio data and visual data collected from multiple emergency vehicles that travelled on this particular road segment or travelled from any road segment.

In one embodiment, the position of the emergency vehicle 423 is measured by a direction of the emergency vehicle and a distance of the emergency vehicle to the ADV 101. The direction of the emergency vehicle can be represented by a degree of an angle between a line representing the ADV 101 and a line extending from the ADV 101 to the emergency vehicle. The line representing the ADV 101 can be a line that passes through the ADV 101 along the travelling direction of the ADV 101. The moving direction of the emergency vehicle 425 indicates whether the emergency vehicle is moving towards the ADV 101 or moving away from the ADV 101.

In one embodiment, the output information from the emergency detection module 308 can be used by the autonomous driving system 110 to generate commands or signals to be sent to the vehicle control system 111 via the CAN bus module 321. Based on the commands or signals, the vehicle control system 111 can control the ADV 101 to take appropriate actions.

In one embodiment, the ADV 101 can steer out of a current driving lane or brake to decelerate or steer to the side of the road, in response to determining that the emergency vehicle is moving towards the ADV 101. If the emergency vehicle is moving away from the ADV 101, the ADV 101 can continue along its current path without disturbance.

Figure 5:
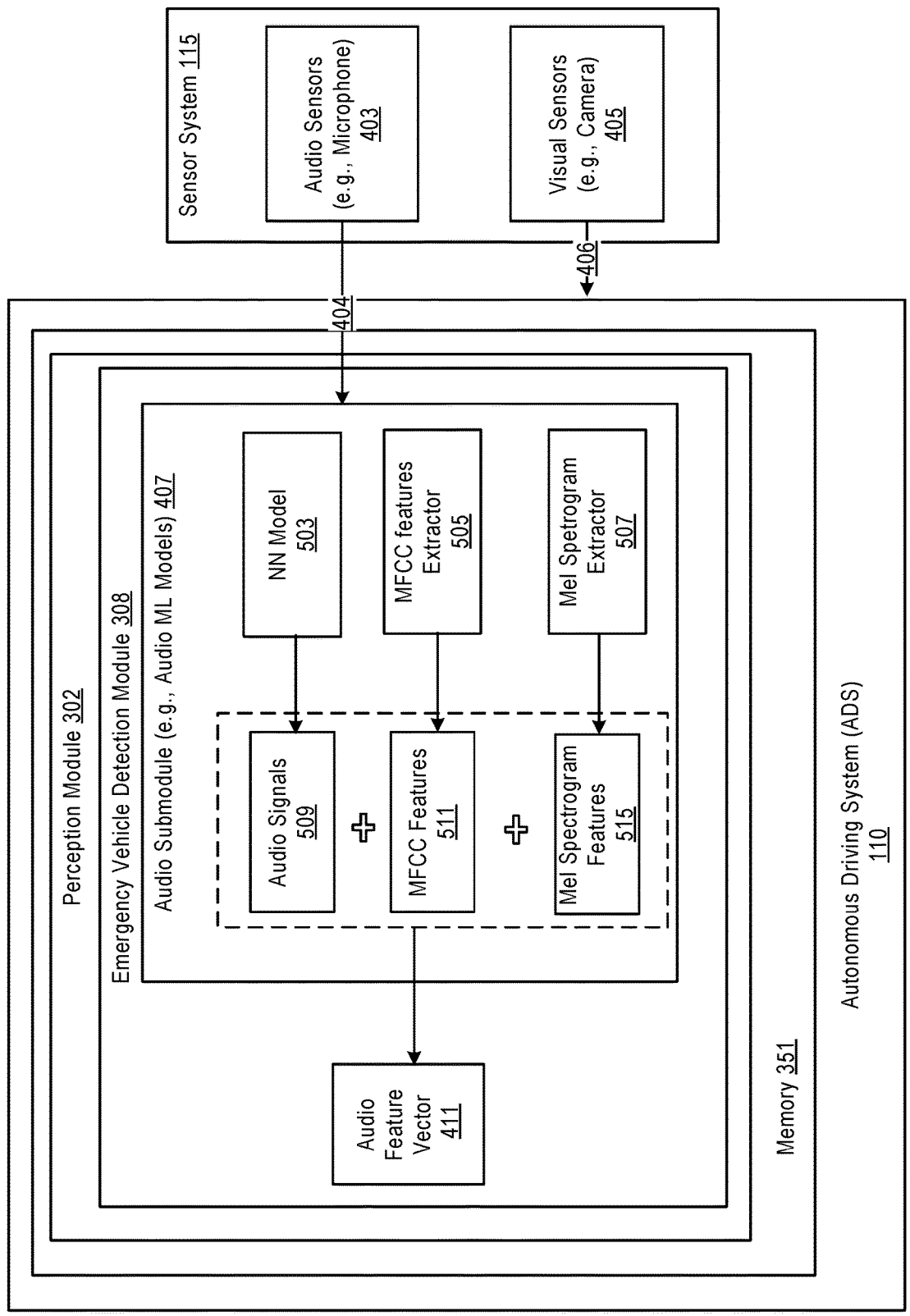
FIG. 5 further illustrates the emergency vehicle detection system according to one embodiment.

FIG. 5 further illustrates the emergency vehicle detection system 400 according to one embodiment. More specifically, FIG. 5 illustrates in details the audio submodule 407.

In one embodiment, the audio submodule 407 can include a number of machine learning models for extracting audio features of different levels. A neural network model (e.g., a CNN) 503 can be used to extract audio signals 509 from the raw audio data captured by the audio sensors 403. As described above, the stream of audio signals captured by the audio sensors 403 can be converted into a numerical array and then split into as many blocks (windows) as the number of image frames in the sequence of captured image frames by the visual sensors 405. The extracted audio signals 509 can be a vector including features such as a frequency, an amplitude, and a phrase of each window (block) of the audio signals.

In one embodiment, a Mel Frequency Cepstral Coefficents (MFCC) feature extractor 505 can extract MFCC features 511 from the raw audio data captured by the audio sensors 403. MFCCs are coefficients that collectively make up a Mel-frequency cepstrum (MFC), which is a representation of the short-term power spectrum of a sound, based on a linear cosine transform of a log power spectrum on a nonlinear Mel scale of frequency. The extracted MFCC features 511 is a feature vector.

The MFCC extractor 505 can be a trained neural network model or a software application that implements an MFCC extraction algorithm. In one implementation, the algorithm can perform operations to extract MFCC features from audio data, including windowing the audio signals in the audio data, applying the Discrete Fourier Transform (DFT), taking the log of the magnitude, and then warping the frequencies on a Mel scale, followed by applying the inverse DCT.

A Mel spectrogram extractor 507 can extract Mel spectrogram features 515 from the raw audio data captured by the audio sensors 403. A Mel spectrogram is a spectrogram where the frequencies are converted to the Mel scale. A spectrogram is a visual representation of the spectrum of frequencies of a signal as it varies with time. The Mel spectrogram extractor 507 can be a trained neural network model or a software application that implements a Mel spectrogram features extraction algorithm. The extracted Mel spectrogram features 511 can be a feature vector.

In one embodiment, the audio signals feature vector 509, the MFCC feature vector 511, and the Mel spectrogram feature vector 515 can be concatenated together to form the audio feature vector 411, which is further concatenated with the visual feature vector 417 to form the audio-visual feature vector 410.

In one embodiment, the three features vectors 509, 511, and 515 are synchronized at the frame/block level, the concatenating of these vectors can be performed by simply combining the feature vectors into a single feature vector.

Figure 6:
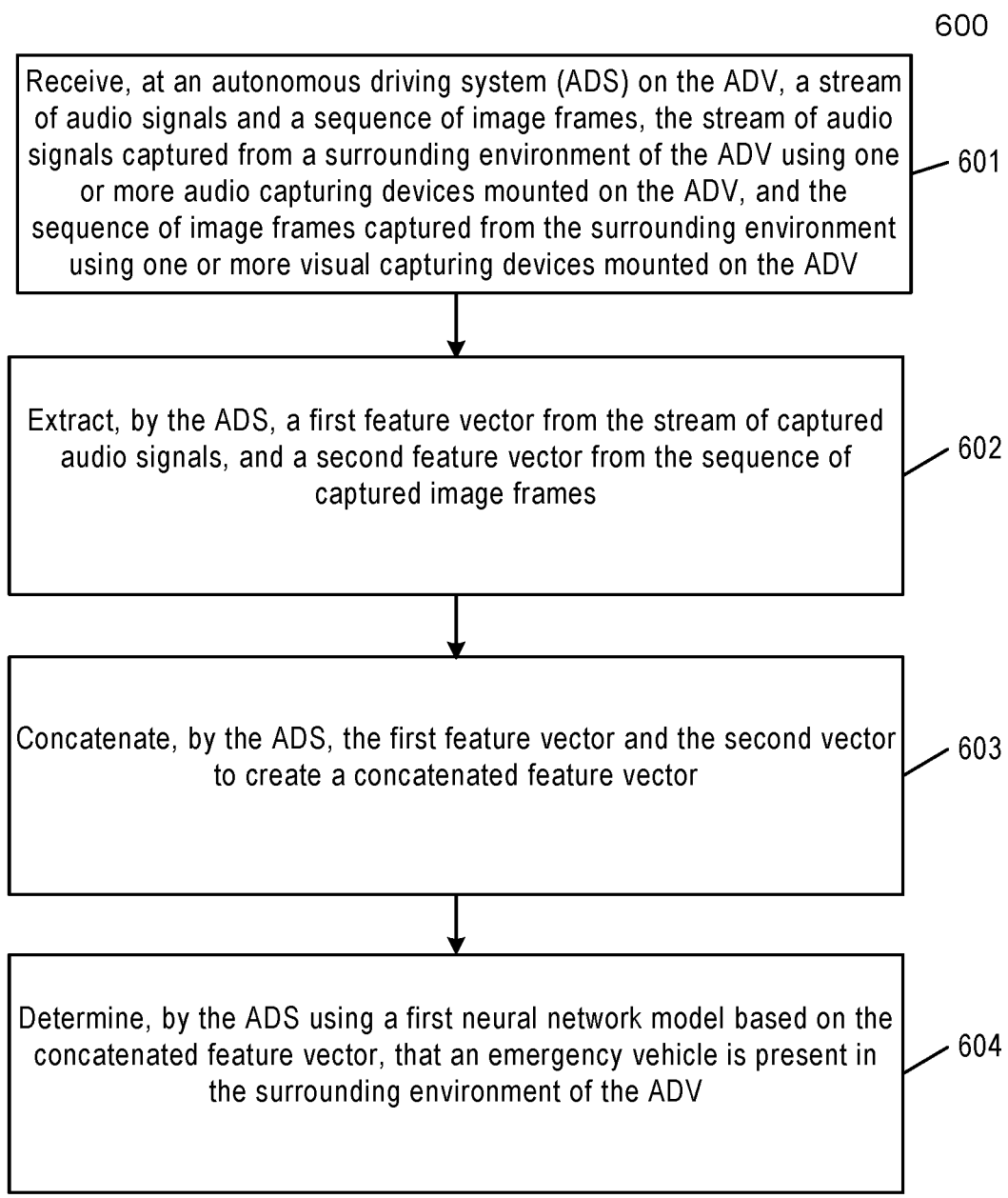
FIG. 6 illustrates a process of detecting an emergency vehicle according to one embodiment.

FIG. 6 illustrates a process 600 of detecting an emergency vehicle according to one embodiment. Process 600 may be performed by processing logic which may include software, hardware, or a combination thereof. For example, process 600 may be performed by the autonomous driving system described in FIG. 4.

As shown in FIG. 6, in operation 601, the processing logic receives a stream of audio signals and a sequence of image frames, the stream of audio signals captured from a surrounding environment of the ADV using one or more audio capturing devices mounted on the ADV, and the sequence of image frames captured from the surrounding environment using one or more image capturing devices mounted on the ADV. In operation 602, the processing logic extracts a first feature vector from the stream of captured audio signals, and a second feature vector from the sequence of captured image frames. In operation 603, the processing logic concatenates the first feature vector and the second vector to create a concatenated feature vector. In operation 604, the processing logic determines, using a first neural network model based on the concatenated feature vector, that an emergency vehicle is present in the surrounding environment of the ADV.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of operating an autonomous driving vehicle (ADV), the method comprising:
   receiving, at an autonomous driving system (ADS) on the ADV, a stream of audio signals captured using one or more audio capturing devices and a sequence of image frames captured using one or more image capturing devices mounted on the ADV from a surrounding environment of the ADV;
   extracting, by the ADS, a first feature vector from the stream of captured audio signals, and a second feature vector from the sequence of captured image frames;
   concatenating, by the ADS, the first feature vector and the second vector to create a concatenated feature vector; and
   determining, by the ADS using a first neural network model based on the concatenated feature vector, that an emergency vehicle is present in the surrounding environment of the ADV.

2. The method of claim 1, wherein the first neural network model is a multi-layer perceptron (MLP) network.

3. The method of claim 1, further comprising:
determining, using the first neural network model, a position of the emergency vehicle, and a moving direction of the emergency vehicle.

4. The method of claim 3, further comprising:
controlling, based on the position and the moving direction of the emergency vehicle, the ADV, including at least one of steering the ADV out of a current driving lane or braking the ADV to decelerate, in response to determining the position of the ADV.

5. The method of claim 1, wherein extracting the first feature vector comprises:
extracting, using a second neural network model, a third feature vector from the stream of captured audio signals, the third feature vector being a vector of basic audio features;
extracting, using a third neural network model, a fourth feature vector from the stream of captured audio signals, the fourth feature vector being a vector of Mel Frequency Cepstral Coefficents (MFCC) features; and
concatenating the third feature vector and the fourth feature vector into a single feature vector.

6. The method of claim 5, further comprising:
extracting, using a fourth neural network model, a fifth feature vector from the stream of captured audio signals, the fifth feature vector being a vector of Mel histogram features; and
concatenating the third feature vector, the fourth feature vector, and the fifth feature vector into the single feature vector.

7. The method of claim 1, wherein the ADS uses a convolutional neural network to extract the second feature vector.

8. The method of claim 1, wherein the one or more audio capturing devices include one or more microphones, and wherein the one or more image capturing devices include one or more cameras.

9. A non-transitory machine-readable medium having instructions stored therein, which when executed by a processor, cause the processor to perform operations of operating an autonomous driving vehicle (ADV), the operations comprising:
receiving, at an autonomous driving system (ADS) on the ADV, a stream of audio signals captured using one or more audio capturing devices and a sequence of image frames captured using one or more image capturing devices mounted on the ADV from a surrounding environment of the ADV;
extracting, by the ADS, a first feature vector from the stream of captured audio signals, and a second feature vector from the sequence of captured image frames;
concatenating, by the ADS, the first feature vector and the second vector to create a concatenated feature vector; and
determining, by the ADS using a first neural network model based on the concatenated feature vector, that an emergency vehicle is present in the surrounding environment of the ADV.

10. The non-transitory machine-readable medium of claim 9, wherein the first neural network model is a multi-layer perceptron (MLP) network.

11. The non-transitory machine-readable medium of claim 9, wherein the operations further comprise:
determining, using the first neural network model, a position of the emergency vehicle, and a moving direction of the emergency vehicle.

12. The non-transitory machine-readable medium of claim 11, wherein the operations further comprise:
controlling, based on the position and the moving direction of the emergency vehicle, the ADV, including at least one of steering the ADV out of a current driving lane or braking the ADV to decelerate, in response to determining the position of the ADV.

13. The non-transitory machine-readable medium of claim 9, wherein extracting the first feature vector comprises:
extracting, using a second neural network model, a third feature vector from the stream of captured audio signals, the third feature vector being a vector of basic audio features;
extracting, using a third neural network model, a fourth feature vector from the stream of captured audio signals, the fourth feature vector being a vector of Mel Frequency Cepstral Coefficents (MFCC) features; and
concatenating the third feature vector and the fourth feature vector into a single feature vector.

14. The non-transitory machine-readable medium of claim 13, wherein the operations further comprise:
extracting, using a fourth neural network model, a fifth feature vector from the stream of captured audio signals, the fifth feature vector being a vector of Mel histogram features; and
concatenating the third feature vector, the fourth feature vector, and the fifth feature vector into the single feature vector.

15. The non-transitory machine-readable medium of claim 9, wherein the ADS uses a convolutional neural network to extract the second feature vector.

16. The non-transitory machine-readable medium of claim 9, wherein the one or more audio capturing devices include one or more microphones, and wherein the one or more image capturing devices include one or more cameras.

17. A data processing system, comprising:
a processor; and
a memory coupled to the processor to store instructions, which when executed by the processor, cause the processor to perform operations of operating an autonomous driving vehicle (ADV), the operations comprising:
receiving, at an autonomous driving system (ADS) on the ADV, a stream of audio signals captured using one or more audio capturing devices and a sequence of image frames captured using one or more image capturing devices mounted on the ADV from a surrounding environment of the ADV,
extracting, by the ADS, a first feature vector from the stream of captured audio signals, and a second feature vector from the sequence of captured image frames,
concatenating, by the ADS, the first feature vector and the second vector to create a concatenated feature vector, and
determining, by the ADS using a first neural network model based on the concatenated feature vector, that an emergency vehicle is present in the surrounding environment of the ADV.

18. The system of claim 17, wherein the first neural network model is a multi-layer perceptron (MLP) network.

19. The system of claim 17, wherein the operations further comprise:
determining, using the first neural network model, a position of the emergency vehicle, and a moving direction of the emergency vehicle.

20. The system of claim 19, wherein the operations further comprise:
controlling, based on the position and the moving direction of the emergency vehicle, the ADV, including at least one of steering the ADV out of a current driving lane or braking the ADV to decelerate, in response to determining the position of the ADV.

21. The system of claim 17, wherein extracting the first feature vector comprises:
extracting, using a second neural network model, a third feature vector from the stream of captured audio signals, the third feature vector being a vector of basic audio features;
extracting, using a third neural network model, a fourth feature vector from the stream of captured audio signals, the fourth feature vector being a vector of Mel Frequency Cepstral Coefficents (MFCC) features; and
concatenating the third feature vector and the fourth feature vector into a single feature vector.

22. The system of claim 21, wherein operations further comprise:
extracting, using a fourth neural network model, a fifth feature vector from the stream of captured audio signals, the fifth feature vector being a vector of Mel histogram features; and
concatenating the third feature vector, the fourth feature vector, and the fifth feature vector into the single feature vector.

* * * * *